United States Patent Office 2,768,129
Patented Oct. 23, 1956

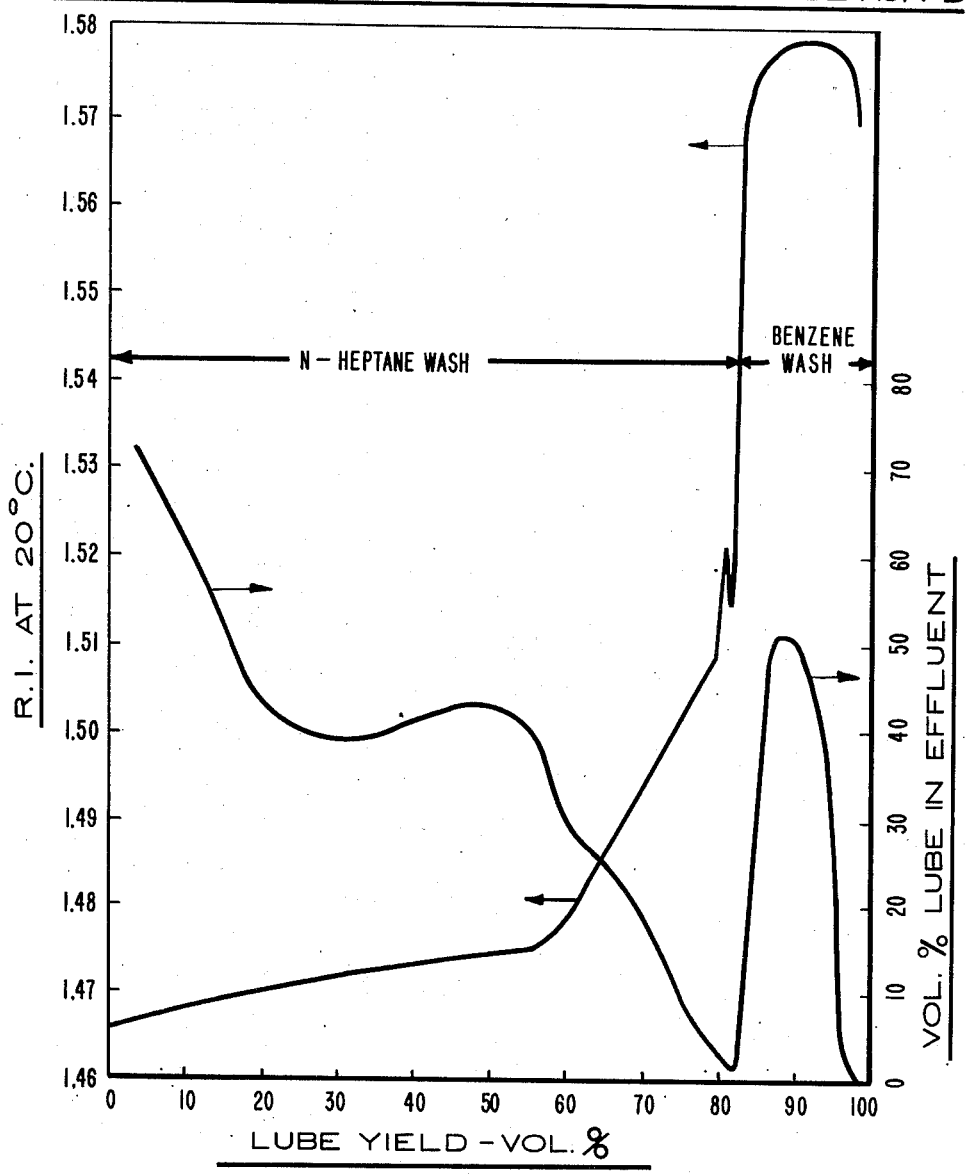

2,768,129

OXIDATION RESISTANT MINERAL OILS AND METHOD OF PREPARING SAME

William T. Knox, Jr., Cranford, N. J., assignor to Esso Research and Engineering Company, a corporation of Delaware Application July 1, 1953, Serial No. 365,363

5 Claims. (Cl. 196—147)

The present invention relates to mineral oils having improved resistance to oxidation. It particularly relates to such oils that have been stabilized against oxidation by the addition of a small amount of the aromatic-type extract separated during a silica gel extraction step.

The process of extracting mineral lubricating oil stocks with silica gel is well known and is particularly useful for separating the high viscosity index, more paraffinic components from the low viscosity index, more aromatic components. As a rule the extraction step is carried out by adsorbing the lubricating oil feed stock on the silica gel in a suitable contacting device followed by desorbing the relatively loosely adsorbed paraffinic components with a non-polar solvent. The more strongly adsorbed aromatic constituents may then be desorbed by contacting the gel with a polar solvent or by other means.

This extraction process is quite effective for producing high viscosity index motor lubricants. However, it has been found that the extracted oil is quite unstable and is easily oxidized under conditions prevailing in most internal combustion engines. Such oxidation leads not only to the formation of materials which deposit on engine parts but also to the formation of acidic compounds that corrode sensitive bimetallic bearings and the like. Although it is generally true that mineral lubricating oils are subject to some oxidation, it has been found that the silica gel-extracted oil is less stable than the original stock charged to the extraction step. This indicates that certain components of the feed stock are natural inhibitors, and that these materials are removed from the paraffinic components during the extraction step.

Consequently, it is necessary to inhibit such silica gel raffinates with conventional auxiliary antioxidant additives, the amount of additive used depending largely upon the extent to which the stock has been extracted and the type of base stock employed. It is a primary object of the present invention to provide a silica-gel extracted oil of improved stability that utilizes only the components of the original feed stock to the extraction step. As a further object, the invention contemplates the provision of a superior antioxidant additive prepared by the silica gel extraction of certain lubricating oil base stocks.

In accordance with the present invention, the aromatic extract obtained from the silica gel extraction of a paraffinic lubricating oil base stock is employed as a potent oxidation inhibitor for mineral oils. In a preferred embodiment of the present invention the high viscosity index raffinate from a silica gel extraction step has added to it an oxidation-inhibiting amount of a relatively narrow fraction of the highly aromatic extract recovered from the extraction operation.

It has been found that a silica gel raffinate inhibited by the narrow-range aromatic fraction has less tendency to oxidize than the original feed stock; this is quite unexpected since the amount of extract added back to the raffinate is at least an order of magnitude less than the total amount of extract removed from the base oil. For example, a 0–60% raffinate containing only 1%, based on the raffinate, of a 98–99% fraction from the same extraction run gave a composition less susceptible to oxidation and to formation of acidic components than the 0–100% feed.

This surprising discovery leads to the conclusion that silica gel extraction involves more than a mere concentration of natural inhibitors in the aromatic components. Evidently some of the less stable components of the feed stock are likewise more strongly adsorbed than are the paraffinic components and are distributed through the extract portion. On the other hand, the unstable components must be less strongly adsorbed than the natural inhibitors since the potency of the aromatics fractions as inhibitors increases as the desorbate yield range increases. For these reasons, a relatively narrow fraction of the total aromatic extract is selected in order to eliminate the main bulk of the unstable compounds, and the narrow fraction preferably comes from the most strongly adsorbed aromatic portion to obtain the greatest inhibiting potency.

The following example illustrates various modes for carrying out the present invention.

EXAMPLE 1.—SILICA GEL EXTRACTION OF PARAFFIN-BASE LUBRICANT

The following studies were carried out on a paraffinic-base lubricating oil distillate derived from a Panhandle crude. The feed stock had the following inspections:

| | |
|---|---|
| Gravity, ° API | 26.6 |
| Flash, ° F | 445 |
| S. U. S. viscosity at 100° F | 279 |
| S. U. S. viscosity at 210° F | 49.7 |
| Viscosity index | 83 |
| Pour point, ° F | 20 |
| Refractive index at 20° C | 1.4958 |
| Sulfur content, weight percent | 0.69 |

*Run A.—Preparation of stable high V. I. extracted lubricant*

In this run a mixture of equal volumes of the above feed stock and n-heptane were charged to a fixed-bed silica gel column 4″ in diameter and 12 feet high using a 16:1 weight ratio of gel to lubricating oil feed stock, room temperature and gravity flow, using 28–200 mesh silica gel. The feed stock was completely adsorbed by the gel. Desorption was carried out by a primary wash with 31 volumes of n-heptane per volume of silica gel until no more lube fractions were desorbed, and then with a secondary wash of 31 volumes of benzene, to desorb completely the adsorbed lube aromatics. The desorbed fractions were then stripped free of diluent by distilling to a maximum liquid temperature of 375° F. and then bubbling with nitrogen at this temperature.

The recovered 0–60% desorbate yield range raffinate fraction comprising paraffinic-type hydrocarbons had the following inspections:

| | |
|---|---|
| Gravity, ° API | 33.5 |
| S. U. S. viscosity at 100° F | 162 |
| S. U. S. viscosity at 210° F | 45.1 |
| Viscosity index | 118 |
| Refractive index at 20° C | 1.4712 |

The 98–99% desorbate yield range aromatic fraction from this run had a refractive index of 1.5485 at 20° C.

The lubricating oil feed stock, the 0.60% raffinate and a blend of the 0–60% raffinate containing 1.0% by weight of the 98–99% fraction were tested for susceptibility to oxidation by a modified ASTM breakdown test as follows:

Four fluid ounces of the oil to be tested were placed in an unstoppered clean glass bottle. The filled bottle was then placed in a steel pressure cylinder, the cylinder flushed with nitrogen, and the cylinder sealed with a pressure cap. The temperature was then increased to 212° F. Oxygen was admitted into the cylinder after it reached test temperature until the pressure was 100 p. s. i. g. The oxygen supply was then shut off. After a certain number of hours (generally 24 to 64) the decrease in pressure inside the cylinder was noted. This decrease was due to oxygen reacting with the lubricating oil. The oil was then removed from the cylinder and tested for various physical inspections, such as neutralization number and viscosity.

The results of these tests are shown in Table I below:

TABLE I

| Lubricant Tested | ASTM Breakdown Test | | |
| --- | --- | --- | --- |
| | Duration, Hrs. | Pressure Drop, Lbs./Sq. In. | Neutralization No. of Lube |
| 1. Charge Stock (100%) | 64 | 10 | 0.10 |
| 2. 0–60% Lube Fraction | 64 | >25 | 6.25 |
| 3. 0–60% Lube Fraction Plus 1.0% of 98–99% Aromatic Fraction | 64 | 3 | 0.03 |

The silica gel extracted 0–60% fraction was much more susceptible to oxidation than the feed stock showing that a substantial portion of the natural oxidation inhibitors were removed during the extraction step. However, the extracted fraction containing only 1% of the narrow aromatic fraction was more stable than the feed stock. This not only shows that the aromatic fraction is concentrated in natural inhibitors but also indicates that the silica gel fractions above the 60% yield range contain unstable components that impair the stability of the feed stock.

Run B.—Study of various extracted aromatic fractions as inhibitors

This run was carried out by substantially the identical procedure used in Run A employing the same charge stock. The desorbed cuts from this run were segregated, freed of solvent and some of the cuts were analyzed for sulfur as follows:

| Desorbate Yield Range, Percent | Sulfur, Wt. Percent |
| --- | --- |
| Charge (100%) | 0.69 |
| 0–62 (non-aromatic) | 0.17 |
| 62–69 (non-aromatic) | 0.21 |
| 70–73 (aromatic) | 1.43 |
| 73–80 (aromatic) | 1.36 |
| 90–93 (aromatic) | 1.57 |
| 97–98 (aromatic) | 1.72 |

The sulfur compounds were concentrated in the aromatic fractions, and sulfur content increased as desorbate yield range increased. More detailed analyses are given on three of the aromatic fractions as follows:

| Desorbate Yield Range, Vol. Percent | 73–80 | 90–93 | 99–99.8 |
| --- | --- | --- | --- |
| Inspections: | | | |
| R. I. at 20° C | 1.5360 | 1.5555 | 1.5480 |
| Carbon, Wt. Percent | 86.43 | 87.32 | (¹) |
| Hydrogen, Wt. Percent | 11.34 | 10.77 | (¹) |
| Sulfur, Wt. Percent | 1.36 | 1.57 | (¹) |
| Nitrogen, Wt. Percent | 0.03 | 0.08 | (¹) |
| Oxygen, Wt. Percent | 0.84 | 0.26 | (¹) |

¹ Insufficient sample for analysis.

Three blends were prepared, each containing 99% of the 0–61% yield range paraffinic raffinate from this run and 1% of one of the above aromatic fractions. The 0–61% fraction was used to insure leaving out the low V. I. materials. These blends were submitted to the ASTM breakdown test described in connection with Run A. Results of the tests follow in Table II:

TABLE II

| Inhibitor in 0–61% Yield Fraction | ASTM Test | | Inspections of Tested Oil | | | | | |
| --- | --- | --- | --- | --- | --- | --- | --- | --- |
| | Duration, Hours | Pressure Drop, Lbs./Sq. In. | Gravity, °API | S. S. U. Vis. at 100° F. | V. I. | R. I. at 20° C. | Neut. No. | Sludge Formation |
| None | | | ¹ 33.5 | ¹ 170 | ¹ 116 | ¹ 1.4708 | 0 | |
| None | 67 | >24 | 29.7 | 239 | 93 | 1.4723 | 9.61 | Yes. |
| 1% of 73–80% Fraction | 45 | 3 | 33.5 | 173 | 113 | 1.4714 | 0.07 | No. |
| 1% of 90–93% Fraction | 45 | 5 | 33.5 | 173 | 114 | 1.4718 | 0.05 | No. |
| 1% of 99–99.8% Fraction | 45 | 2 | 33.2 | 174 | 113 | 1.4718 | 0.02 | No. |

¹ Inspections on 0–61% fraction before test.

All of the aromatic fractions improved the ability of the raffinate to resist oxidation, viscosity increase and V. I. lowering. The fractions from the 90–100% portion of desorbed hydrocarbons (the last 30% cut of the aromatic extract) were superior to the 73–80% fraction from the standpoint of inhibiting the formation of acidic bodies (as measured by neutralization number). In this connection, neutralization number gives an indication of the extent to which lubricating oils will corrode the surfaces of copper-lead bearings and the like in internal combustion engines.

Run C.—Study of R. I. and yield characteristics of extracted lubricant

This run was carried out in accordance with the procedure used in Run A using a column ¾" in diameter and 40 feet high packed with silica gel. A weight ratio of 2.2:1 of gel to oil charge stock was used, the charge stock being the one described under the heading "Example I." As in Run A, the oil feed diluted with heptane was charged to the column, and desorption was carried out by a heptane wash followed by a benzene wash. The various desorbed cuts were freed of diluent and analyzed.

The attached figure shows the relationship between R. I. at 20° C. and lube yield, and between volume percent lube in the desorbed effluent and lube yield. The high viscosity index paraffinic components from the charge stock employed were in the 0 to 70% lube yield range and had refractive indices well below about 1.5. In general, the preferred lubricant raffinate fraction comes within the 0 to 65 volume percent yield range, while the most potent extract fraction will be derived from the 75–100%, preferably the 90–100%, range, depending to some extent on the extraction conditions and of feed stock employed.

A portion of the 0–31% yield range fraction from this run, and a blend of this fraction containing 1% by volume of the 98.5–98.7% fraction from the run, were evaluated by the ASTM breakdown test described above. The results are shown in Table III below:

TABLE III

| Inhibitor in 0-31% Yield Fraction | ASTM Test | | Inspections of Tested Oil | | | | |
|---|---|---|---|---|---|---|---|
| | Duration, Hrs. | Pressure Drop, Lbs./Sq. In. | Gravity, °API | S. S. U. Vis. at 100° F. | V. I. | R. I. at 20 °C. | Neut. No. |
| None | | | [1] 34.0 | [1] 166 | [1] 117 | [1] 1.4692 | |
| None | 64 | 23 | 31.4 | 194 | 104 | 1.4699 | 6.2 |
| 1% of 98.5-98.7% Fraction [2] | 64 | 4 | 33.8 | 166 | 117 | 1.4699 | 0.26 |

[1] Inspections on fractions before test.
[2] This fraction had a 1.5585 R. I. at 20° C.

The addition of the small amount of the aromatic fraction almost completely stabilized the raffinate.

The various procedures employed in extracting the lubricating oil base stock with silica gel are well known to the art and need not be described in detail herein. In general, the silica gel may have a particle size in the range of about 20 to 350 mesh and may be used in the form of a fixed bed or in a suspension-type contacting zone. The amount of silica gel employed should be in excess of the amount of oil to be contacted. In a single pass operation, a weight ratio of silica gel to oil in the range of about 2:1 to 30:1 will be satisfactory. Ordinary treating temperatures are usually best, but those in the range of about 60°–200° F. may be used.

The oil charge stock is preferably derived from a paraffinic base crude such as Panhandle crudes, Pennsylvania crudes and the like. The oil feed stock may have an S. U. S. viscosity at 210° F. in the range of about 40 to 200, and may be a distillate or a residual stock from which wax and asphaltic constituents have been removed.

The oil feed is preferably diluted with a light hydrocarbon solvent in order to facilitate contact between the gel and feed. Paraffinic components including high viscosity index constituents of the feed are desorbed from the contacted gel by washing with relatively large amounts of a light (e. g. $C_5$—$C_8$) paraffinic fraction at ordinary room temperature. When no more paraffinic materials are desorbed, the temperature of the treating zone may be increased to slightly below the boiling point of the light paraffinic fraction and washed with additional quantities thereof to desorb the aromatic components. In another mode, the flow of light paraffinic fraction may be discontinued and the gel washed at room temperature with a light aromatic fraction or a highly polar compound such as a light alcohol to desorb aromatics. The gel may then be completely regenerated by steaming at elevated temperatures, or by other means.

Prior art describing various modifications of the silica gel extraction process includes U. S. Patents 2,552,434 issued to W. T. Knox, Jr. et al. and 2,589,981 to R. L. Weeks.

The various desorbed cuts may then be distilled to remove the light solvent, and are combined as desired. Thus the paraffinic raffinate cuts may all be combined to form an oil having a viscosity index in excess of 100. The amount of the desorbed aromatic extract added thereto may be varied in the range of about 0.1 to 5.0% by weight, based on the raffinate fraction. Since relatively large amounts of the aromatics will reduce the viscosity index of the oil excessively, it is preferred that the amount added be in the range of about 0.2 to 2.0% by weight. It is also preferred that the relatively narrow antioxidant fraction have a spread of less than 50% based on the total aromatic extract, more preferably less than 10% of the total extract. Furthermore, the narrow fraction is more effective if it is selected from the last 30% of the total aromatic fraction. In general, the narrow aromatic cuts will have a refractive index at 20° C. of above about 1.53. Those resulting from Panhandle oils will have sulfur contents above about 1%.

The composition of the present invention may also include other conventional additive materials such as detergents, pour point depressors, viscosity index improvers, oiliness agents, etc.

Although the present invention has emphasized the addition of the aromatic cut back to raffinate produced in the same extraction step, the aromatic fraction may be used as an inhibitor in various mineral oils including motor fuels, diesel fuels, process oils, heating oils, lubricating oils, etc. The extract from one silica gel treat may also be used to inhibit the raffinate from the silica gel extraction of another base stock. The silica gel extract may also be used to stabilize raffinates from the solvent extraction of various base stocks, straight mineral oil distillates and residuals, and the like. Other modifications and applications coming within the spirit and scope of this invention will be obvious to one skilled in the art.

What is claimed is:

1. An improved lubricating oil composition comprising a mineral lubricating oil containing an oxidation inhibiting amount of a relatively narrow fraction of a silica gel aromatic extract obtained from a paraffinic-base mineral oil base stock, said fraction being selected from the last 30% of the aromatics most strongly adsorbed by the silica gel and having a spread of less than 10% of the total aromatic extract.

2. An improved lubricating oil composition consisting essentially of a mineral lubricating oil and about 0.1 to 5% by weight, based on said mineral lubricating oil, of a relatively narrow fraction of a silica gel aromatic extract obtained by the silica gel extraction of a paraffinic-base mineral lubricating oil base stock and by then selectively desorbing the adsorbed aromatic constituents thereof, said narrow fraction being selected from the last 30% of the aromatics most strongly adsorbed by the silica gel and having a spread of less than 10% of the total aromatic extract and a refractive index at 20° C. above about 1.53.

3. An improved lubricating oil composition consisting essentially of a silica gel paraffinic raffinate containing in the range of about 0.2 to 2.0% by weight, based on said raffinate, of a relatively narrow fraction of a silica gel aromatic extract, said raffinate and extract being obtained by adsorbing a paraffinic-base mineral lubricating oil base stock obtained from a Panhandle crude on silica gel followed by selectively desorbing from the silica gel the relatively more paraffinic constituents to obtain said raffinate and selectively desorbing from the silica gel the relatively more aromatic constituents to obtain said extract, said narrow fraction being selected from the last 30% of the aromatics most strongly adsorbed by the silica gel and having a spread of less than 10% of the total aromatic extract and a refractive index at 20° C. above about 1.53.

4. A method for preparing a lubricating oil composition having improved resistance to oxidation which comprises adsorbing a paraffinic-base mineral oil base stock on silica gel, selectively desorbing the relatively more aromatic constituents of said base stock from said silica gel to obtain a relatively narrow fraction from the last 30% of the aromatics most strongly adsorbed by the silica gel, said relatively narrow fraction having a spread of less than 10% of the total aromatic extract, and then incorporating into a mineral lubricating oil about 0.1 to 5% by weight of said relatively narrow fraction, based on said mineral lubricating oil.

5. A method for preparing a mineral lubricating oil composition having improved resistance to oxidation which comprises adsorbing a paraffinic-base mineral lubricating oil base stock obtained from a Panhandle crude on silica gel, selectively desorbing from the silica gel the relatively more paraffinic constituents to obtain a paraffinic raffinate, and selectively desorbing from the silica gel the relatively more aromatic constituents to obtain a relatively narrow fraction from the last 30% of the aromatics most strongly adsorbed by the silica gel, said narrow fraction having a spread of less than 10% of the total aromatic extract and having a refractive index of 20° C. above about 1.53, and incorporating into said paraffinic raffinate about 0.2 to 2.0% by weight of said narrow fraction, based on said raffinate.

References Cited in the file of this patent

UNITED STATES PATENTS

| | | |
|---|---|---|
| 1,918,593 | Dow | July 18, 1933 |
| 1,943,808 | Benton et al. | Jan. 16, 1934 |
| 2,281,894 | Von Fuchs et al. | May 5, 1942 |
| 2,427,766 | Diamond | Sept. 23, 1947 |
| 2,643,217 | Watson et al. | June 23, 1953 |
| 2,674,568 | Lillard | Apr. 6, 1954 |